United States Patent
Cho

(10) Patent No.: US 9,624,973 B2
(45) Date of Patent: Apr. 18, 2017

(54) APPARATUS HAVING FRICTION PREVENTING FUNCTION AND METHOD OF MANUFACTURING THE SAME

(71) Applicant: SAMSUNG ELECTRONICS CO., LTD., Suwon-si (KR)

(72) Inventor: Sung-nae Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 853 days.

(21) Appl. No.: 13/653,956

(22) Filed: Oct. 17, 2012

(65) Prior Publication Data

US 2013/0239791 A1 Sep. 19, 2013

(30) Foreign Application Priority Data

Mar. 19, 2012 (KR) .................. 10-2012-0027757

(51) Int. Cl.
*F41F 1/00* (2006.01)
*F16C 32/04* (2006.01)
(Continued)

(52) U.S. Cl.
CPC .......... *F16C 32/0404* (2013.01); *B82Y 30/00* (2013.01); *F41A 21/00* (2013.01);
(Continued)

(58) Field of Classification Search
CPC ...... F16C 32/0404; F41A 21/22; F41A 21/00; F41A 29/04; F42B 12/82; Y10T 29/49636; B82Y 30/00
(Continued)

(56) References Cited

U.S. PATENT DOCUMENTS 5,440,184 A 8/1995 Samy et al.
6,576,598 B2 * 6/2003 Brown ................ C10M 111/04
102/448
(Continued)

FOREIGN PATENT DOCUMENTS

DE 103 55 312 A1 6/2005
EP 1 305 628 B1 5/2005
(Continued)

OTHER PUBLICATIONS

Sung Nae Cho., "Charged-particle oscillation in direct current voltage biased plane-parallel conductors", American Institute of Physics, Physics of Plasmas 19, 000000 (2012) Article No. 028203PHP, 26 Pages Total.
(Continued)

*Primary Examiner* — Michelle R Clement
(74) *Attorney, Agent, or Firm* — Sughrue Mion, PLLC

(57) ABSTRACT

A friction preventing apparatus and a method of manufacturing the same are provided. The apparatus includes: a first object; a second object spaced apart from the first object and facing the first object; and a plurality of charged nanoparticles provided on a surface of one of the first and second objects, such that the nanoparticles are disposed between the first object and the second object. A potential difference is formed between the first and second objects. The nanoparticles may be positively charged and may adhere to the first object, and the first object has a potential lower than a potential of the second object. The nanoparticles may be negatively charged and may adhere to the second object, and the second object has a potential higher than a potential of the first object.

14 Claims, 13 Drawing Sheets

(51) Int. Cl.
*B82Y 30/00* (2011.01)
*F42B 12/82* (2006.01)
*F41A 21/22* (2006.01)
*F41A 21/00* (2006.01)
*F41A 29/04* (2006.01)

(52) U.S. Cl.
CPC .............. *F41A 21/22* (2013.01); *F41A 29/04* (2013.01); *F42B 12/82* (2013.01); *Y10T 29/49636* (2015.01)

(58) Field of Classification Search
USPC .................................................................. 89/8
See application file for complete search history.

(56) References Cited

U.S. PATENT DOCUMENTS

| | | | |
|---|---|---|---|
| 6,733,411 B1 | 5/2004 | Kaplan et al. | |
| 6,762,025 B2* | 7/2004 | Cubicciotti | C07H 21/00 435/6.1 |
| 6,881,444 B2* | 4/2005 | Hong | B05D 1/005 257/E21.114 |
| 6,955,834 B2* | 10/2005 | Rohrbaugh | B01J 39/043 427/180 |
| 7,066,998 B2* | 6/2006 | Rohrbaugh | B01J 39/043 106/286.2 |
| 7,141,429 B2* | 11/2006 | Munson | B01F 13/0076 210/511 |
| 7,267,728 B2* | 9/2007 | Barger | B01J 39/043 134/123 |
| 7,781,350 B2* | 8/2010 | Zachariah | B82Y 30/00 257/E29.07 |
| 8,257,679 B2* | 9/2012 | Ajiri | B01J 3/006 423/592.1 |
| 8,263,192 B2* | 9/2012 | Koberstein | A61L 27/34 427/2.13 |
| 8,541,349 B2* | 9/2013 | Xiao | C23C 4/06 106/287.35 |
| 8,933,860 B2* | 1/2015 | Schlie | F41G 11/00 165/104.14 |
| 2002/0027819 A1 | 3/2002 | Tomanek et al. | |
| 2002/0160224 A1* | 10/2002 | Barger | B01J 39/043 428/689 |
| 2002/0176982 A1* | 11/2002 | Rohrbaugh | B01J 39/043 428/323 |
| 2003/0078170 A1 | 4/2003 | Brown | |
| 2004/0170822 A1* | 9/2004 | Rohrbaugh | B01J 39/043 428/323 |
| 2005/0175649 A1* | 8/2005 | Disalvo | A61F 13/8405 424/401 |
| 2005/0211505 A1 | 9/2005 | Kroupenkine et al. | |
| 2006/0035087 A1* | 2/2006 | Yadav | C03C 27/10 428/411.1 |
| 2006/0060796 A1* | 3/2006 | Subramanian | H01J 37/32412 250/492.21 |
| 2006/0274985 A1 | 12/2006 | Engler et al. | |
| 2007/0111537 A1* | 5/2007 | Zachariah | B82Y 30/00 438/776 |
| 2007/0134420 A1* | 6/2007 | Koberstein | A61L 27/34 427/258 |
| 2007/0277612 A1 | 12/2007 | Ehrfeld et al. | |
| 2008/0138577 A1* | 6/2008 | Sheehan | B81B 3/0075 428/141 |
| 2008/0248201 A1* | 10/2008 | Corkery | C09D 7/1291 427/256 |
| 2009/0155479 A1* | 6/2009 | Xiao | C23C 4/06 427/451 |
| 2010/0029518 A1* | 2/2010 | Markovitz | C10M 125/02 508/113 |
| 2010/0088949 A1* | 4/2010 | Reed | B82Y 30/00 44/322 |
| 2010/0112199 A1* | 5/2010 | McClure | B01D 67/0027 427/180 |
| 2010/0234254 A1 | 9/2010 | Koshima et al. | |
| 2010/0303623 A1 | 12/2010 | Dawoud et al. | |
| 2011/0159273 A1* | 6/2011 | Lukowski | A61L 2/14 428/323 |
| 2011/0192521 A1 | 8/2011 | Ducros et al. | |
| 2011/0210282 A1* | 9/2011 | Foley | B82Y 25/00 252/62.51 R |
| 2011/0281105 A1* | 11/2011 | Campazzi | B05D 7/16 428/328 |
| 2012/0015211 A1* | 1/2012 | Gu | H05B 3/145 428/651 |
| 2012/0237862 A1* | 9/2012 | Yu | G03G 15/754 430/56 |
| 2013/0047945 A1* | 2/2013 | Reed | B01F 3/0807 123/1 A |
| 2013/0189334 A1* | 7/2013 | Disalvo | A61F 13/8405 424/401 |
| 2013/0203916 A1* | 8/2013 | Patel | C09G 1/16 524/262 |
| 2013/0209893 A1* | 8/2013 | Archer | H01M 10/052 429/317 |
| 2013/0239791 A1* | 9/2013 | Cho | F41A 21/00 89/14.7 |
| 2013/0274149 A1* | 10/2013 | Lafitte | C09K 8/905 507/112 |
| 2014/0100145 A1* | 4/2014 | Baran, Jr. | C10M 139/04 508/173 |
| 2014/0197354 A1* | 7/2014 | Olson | B82Y 30/00 252/74 |
| 2014/0349894 A1* | 11/2014 | Quintero | C09K 8/032 507/110 |
| 2015/0047848 A1* | 2/2015 | Bestaoui-Spurr | E21B 43/04 166/305.1 |

FOREIGN PATENT DOCUMENTS

| | | | | |
|---|---|---|---|---|
| EP | 1580528 A1 | 9/2005 | | |
| EP | 1 930 399 A1 | 6/2008 | | |
| EP | 1861892 B1 | 9/2010 | | |
| JP | 6-307451 A | 11/1994 | | |
| JP | 2007-190604 A | 8/2007 | | |
| KR | 20000074578 A | 12/2000 | | |
| KR | 1020060061782 A | 6/2006 | | |
| KR | 1020070040690 A | 4/2007 | | |
| KR | 1020100051160 A | 5/2010 | | |
| KR | 20130106299 A | * | 9/2013 | ............ F41A 21/00 |
| KR | WO 2013141547 A1 | * | 9/2013 | ............ B82Y 30/00 |
| WO | 2010/102024 A2 | 9/2010 | | |

OTHER PUBLICATIONS

International Search Report (PCT/ISA/210) issued Jun. 21, 2013 by the International Searching Authority in counterpart International Application No. PCT/KR2013/002191.
Written Opinion (PCT/ISA/237) issued Jun. 21, 2013 by the International Searching Authority in counterpart International Application No. PCT/KR2013/002191.
Communication dated Oct. 30, 2015 issued by the European Patent Office in counterpart European Patent Application No. 13764037.1.
Communication dated Mar. 2, 2016, issued by the State Intellectual Property Office of People's Republic of China in counterpart Chinese Application No. 201380026252.5.
Communication dated Oct. 27, 2016 issued by the State Intellectual Property Office of the People's Republic of China in counterpart Chinese Patent Application No. 201380026252.5.

* cited by examiner

APPARATUS HAVING FRICTION PREVENTING FUNCTION AND METHOD OF MANUFACTURING THE SAME

CROSS-REFERENCE TO RELATED APPLICATIONS

This application claims priority from Korean Patent Application No. 10-2012-0027757, filed on Mar. 19, 2012, in the Korean Intellectual Property Office, the disclosure of which is incorporated herein in its entirety by reference.

BACKGROUND

1. Field

Apparatuses and methods consistent with exemplary embodiments relate to an apparatus related to friction, and more particularly, to an apparatus with a friction preventing function and a method of manufacturing the apparatus.

2. Description of the Related Art

An object that rolls, rotates, or linearly moves contacts another relevant object, and thus, friction between the two objects is generated. Such friction is necessary for a start operation and a stop operation of an object. However, friction may be a factor which hinders a continuity of motion of a moving object.

Friction generated during motion of an object generates heat, which may affect not only the moving object but also other objects related to the moving object.

Accordingly, oil or grease may be used to decrease the friction. However, oil and the grease are harmful to the environment. Also, friction may not be completely removed by using oil or grease. Oil and grease have a lower performance as time passes, and accordingly, the efficiency of oil or grease is decreased as time passes.

SUMMARY

One or more exemplary embodiments provide an apparatus with a friction preventing function using an electrical method.

One or more exemplary embodiments provide a method of manufacturing the apparatus.

Aspects of the exemplary embodiments will be set forth in part in the description which follows and, in part, will be apparent from the description, or may be learned by practice of the presented embodiments.

According to an aspect of an exemplary embodiment, a friction preventing apparatus includes a first object; a second object spaced apart from the first object and facing the first object; and a plurality of charged nanoparticles provided on a surface of one of the first and second objects, wherein the nanoparticles are disposed between the first object and the second object, and wherein a potential difference is formed between the first object and the second object.

The nanoparticles may be positively charged and may adhere to one of the first and second objects having a lower potential.

The nanoparticles may be negatively charged and may adhere to one of the first and second objects having a higher potential.

Each of the nanoparticles may include a charged core and a shell surrounding the core.

The apparatus may further include a material film covering the nanoparticles and filling gaps between the nanoparticles.

The first object may have an outer circumferential surface, and the second object may surround the outer circumferential surface of the first object.

The first object may be a flat panel, and the second object may be moveable with respect to the flat panel.

The first object may be a rail, and the second object may surround the rail.

The first object may include a conductive layer facing the second object, and the second object may include a conductive layer facing the first object.

The material film may be paint or paste.

The first object may be a conductive pipe, and the second object may be disposed inside the pipe and may be moveable with respect to the pipe.

The pipe may be a gun barrel or a cannon barrel, and the second object may be a bullet or a cannon ball.

The nanoparticles may be uniformly distributed over an entirety of the surface of one of the first and second objects or may be uniformly distributed only over a plurality of areas spaced part from one another on the surface of the one of the first and second objects.

According to an aspect of another exemplary embodiment, a method of manufacturing an apparatus, the method includes attaching a plurality of nanoparticles to a first object; disposing a second object to face the first object, such that the nanoparticles are disposed between the first object and the second object; charging the nanoparticles; and forming a friction-preventing potential difference between the first and second objects.

Each of the nanoparticles may include a charged core and a shell surrounding the core.

The charging of the nanoparticles may include forming a charging potential difference between the first and second objects, wherein the charging potential difference is greater than the friction-preventing potential difference.

The attaching of the nanoparticles may include forming a material film that covers the nanoparticles and fills gaps between the nanoparticles.

According to an aspect of another exemplary embodiment, a method of manufacturing an apparatus, the method includes charging nanoparticles; attaching the charged nanoparticles onto a first object; disposing a second object to face the first object, such that the charged nanoparticles are disposed between the first object and the second object; and forming a potential difference between the first and second objects.

Each the nanoparticles may include a charged core and a shell surrounding the core.

The attaching of the nanoparticles may include forming a material film that covers the nanoparticles and fills gaps between the nanoparticles.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1A:
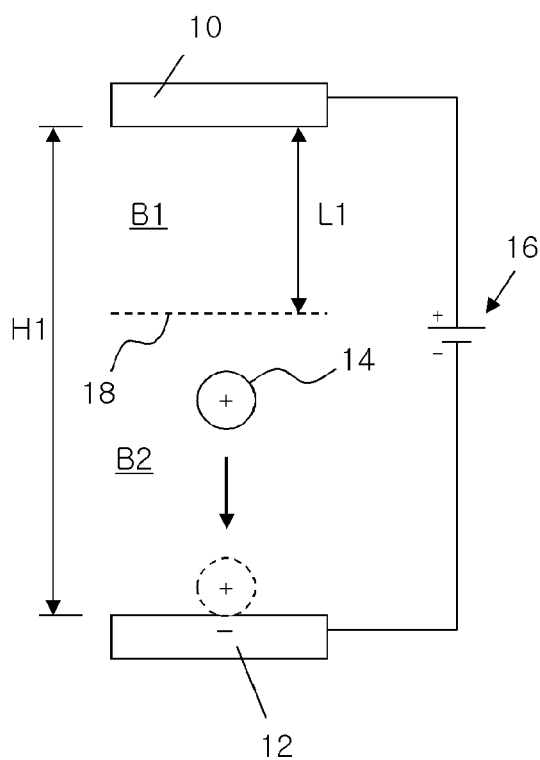
FIGS. 1A to 2C are mimetic diagrams for describing a basic principle applied to an apparatus with a friction preventing function according to an exemplary embodiment.

Hereinafter, exemplary embodiments will be described in detail with reference to the attached drawings. In the drawings, the thicknesses of layers and regions may be exaggerated for clarity.

FIGS. 1A to 2C are mimetic diagrams for describing a basic principle applied to an apparatus with a friction preventing function according to an exemplary embodiment.

Figure 1B:
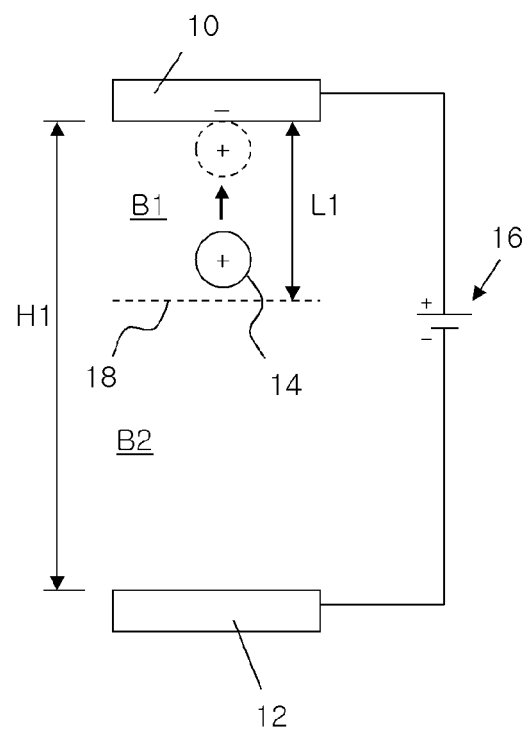

FIGS. 1A and 1B are mimetic diagrams for describing the movement of a positively charged point particle 14 between first and second flat panels 10 and 12 that are parallel to each other and to which a direct current (DC) voltage is applied, according to an initial position of the point particle 14.

Here, the point particle 14 may be a particle that does not internally have a structure like an electron, a proton, a positron, or the like. In FIG. 1, the point particle 14 may be a positron.

Referring to FIG. 1A, the first flat panel 10 and the second flat panel 12 face each other and are spaced apart from each other by a predetermined distance H1. The first and second flat panels 10 and 12 are conductors. The first and second flat panels 10 and 12 are connected to a power source 16. The power source 16 may be a DC power source. The first flat panel 10 is connected to a positive electrode of the power source 16. The second flat panel 12 is connected to a negative electrode of the power source 16. An area between the first and second flat panels 10 and 12 is divided into a first area B1 and a second area B2. A boundary 18 between the first and second areas B1 and B2 is spaced apart from the first flat panel 10 by a first length L1. The first area B1 is an area between the first flat panel 10 and the boundary 18, and the second area B2 is an area between the boundary 18 and the second flat panel 12. A location of the boundary 18 may vary according to the size of the power source 16, or the like.

The boundary 18 may be closer to the first flat panel 10 than to the second flat panel 12.

In FIG. 1A, if, at an early stage, the positively charged point particle 14 is located in the second area B2, the point particle 14 then moves toward the second flat panel 12 to adhere to the second flat panel 12.

As shown in FIG. 1B, if, at an early stage, the point particle 14 is located in the first area B1, even though the point particle 14 is positively charged, the point particle 14 then moves toward the first flat panel 10 to adhere to the first flat panel 10. The reason is that when the point particle 14 is located in the first area B1, a negatively induced charge is generated due to the existence of the point particle 14, and thus, an attractive force between the positively charged point particle 14 and the negatively induced charge in the first flat panel 10 is stronger than repulsive force between the point particle 14 and the electric field generated between the first and second flat panels 10 and 12 according to the application of power by the power source 16. On the other hand, in the second area B2, the repulsive force between the electric field and the point particle 14 is stronger than the attractive force between the positively charged point particle 14 and the negatively induced charge in the second flat panel. Accordingly, when the point particle 14 is located in the second area B2, the point particle 14 moves toward the second flat panel 12 to adhere to the second flat panel 12, as shown in FIG. 1A.

When the point particle 14 is negatively charged instead of being positively charged, that is, when the point particle 14 is an electron, movement of the point particle 14, according to the location of the point particle 14, is opposite to the case in which the point particle 14 is positively charged.

Figure 2A:
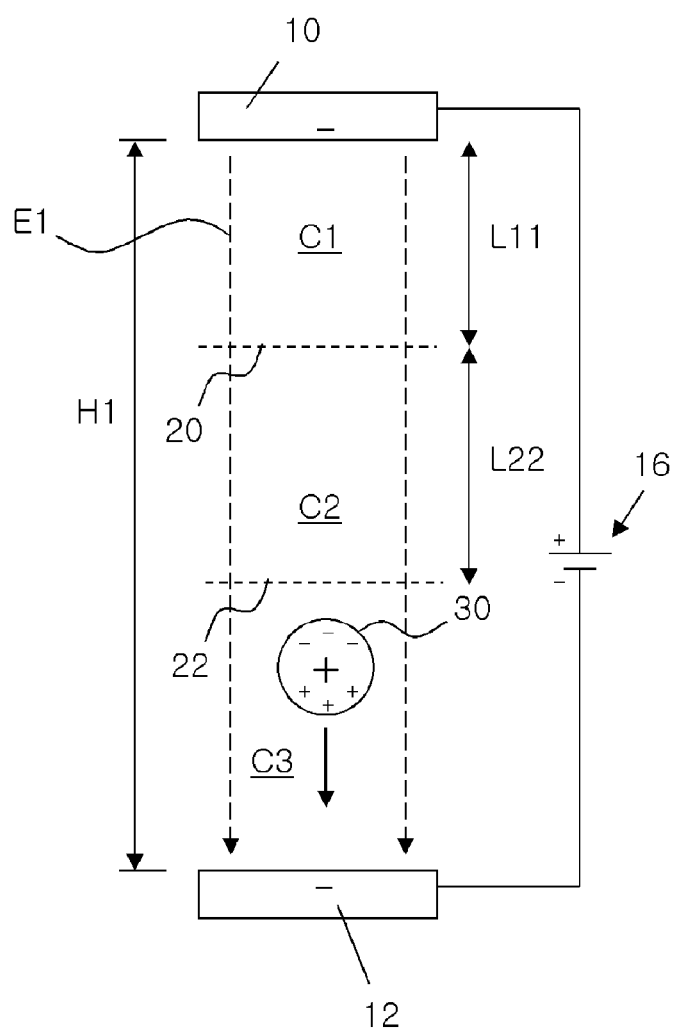
Figure 2B:
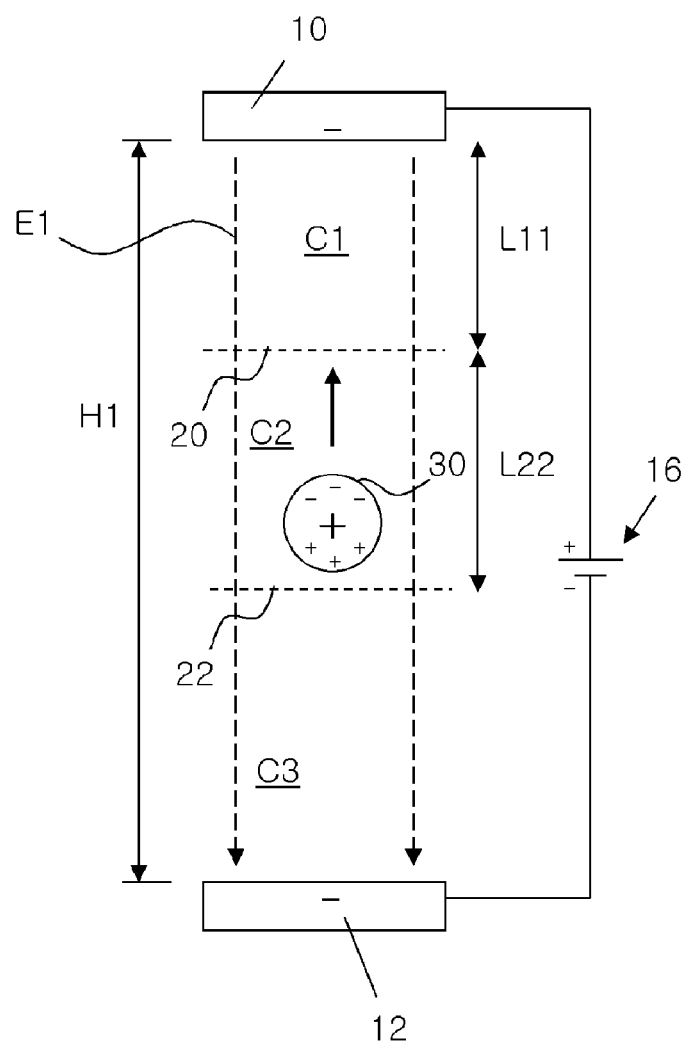
Figure 2C:
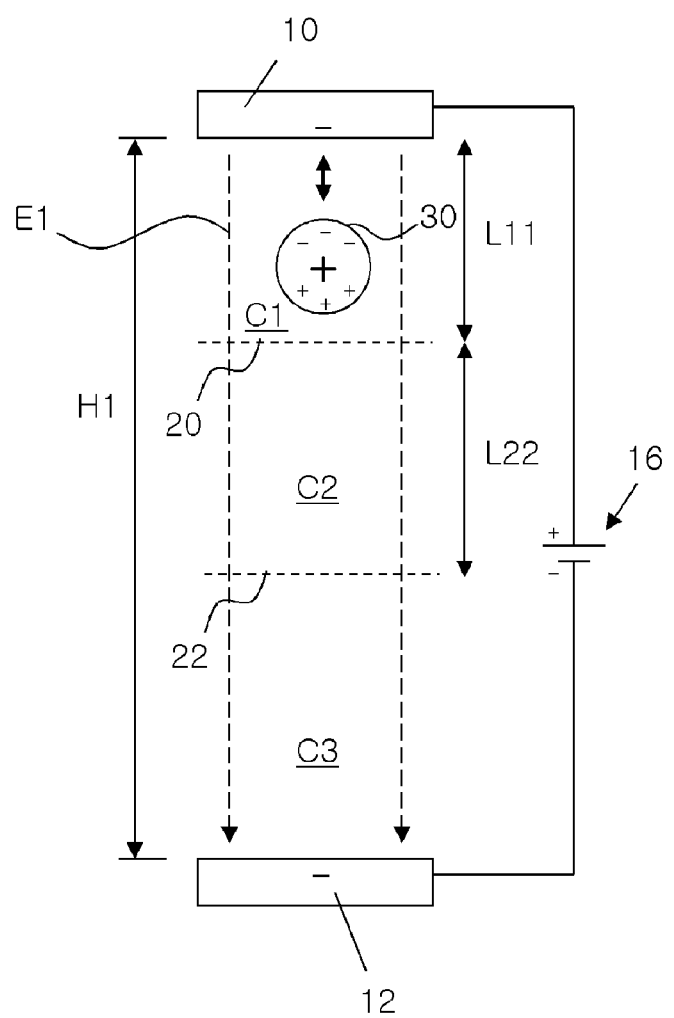

When the point particle 14 of FIG. 1 is a particle having an internal structure of, for example, a nanoparticle, the movement of the nanoparticle is different from the movement of a particle such as a positron or electron. FIGS. 2A to 2C show movement of a positively charged nanoparticle 30 that is located between the first and second flat panels 10 and 12.

In FIGS. 2A to 2C, the area between the first and second flat panels 10 and 12 is divided into first, second, and third areas C1, C2, and C3. A first boundary 20 between the first area C1 and the second area C2 is spaced apart from the first flat panel 10 by a first length L11. A second boundary 22 between the second area C2 and the third area C3 is located between the first boundary 20 and the second flat panel 12 and is spaced apart from the first boundary 20 by a second length L22.

FIG. 2A shows movement of a positively charged nanoparticle 30 at an early stage. Reference numeral E1 denotes an electric field generated between the first and second flat panels 10 and 12 due to application of power by the power source 16. Also, the mark '+' shown in the middle of the nanoparticle 30 denotes an artificial charge, for example, a charge that is charged due to application of an additional voltage. Positive charges (+) and negative charges (−) distributed under the surface of the nanoparticle 30 are induced by the electric field E1 and are depolarization charges. Thus, the electric field E1 may be offset inside the nanoparticle 30 due to the depolarization charges. From among the depolarization charges, the positive charges are distributed on the surface of the nanoparticle 30 that faces the second flat panel 12 having a relatively low voltage, and the negative charges are distributed on the surface of the nanoparticle 30 that faces the first flat panel 10 having a relatively high voltage.

Referring to FIG. 2A, the nanoparticle 30 located in the third area C3 moves toward the second flat panel 12, due to the electric field E1 between the first and second flat panels 10 and 12, to adhere to the second flat panel 12. When the positively charged nanoparticle 30 is located between the first and second flat panels 10 and 12, negative charges (−) are induced in the first and second flat panels 10 and 12 by the charges charged in the nanoparticle 30. When the charges charged in the nanoparticle 30 are negative charges, positive charges are induced in the first and second flat panels 10 and 12.

As shown in FIG. 2B, the nanoparticle 30 may be located in the second area C2 at an early stage. The second area C2 is an area similar to the first area B1 of FIG. 1A. In the second area C2, a strong attractive force is present between the positive charges charged in the middle of the nanoparticle 30 and the negative charges (−) induced in the first flat panel 10. The attractive force is proportional to $1/r^2$, wherein 'r' is the distance between the first flat panel 10 and the nanoparticle 30. Even though the nanoparticle 30 located in the second area C2 is in the electric field E1, the nanoparticle 30 moves toward the first flat panel 10 instead of the second flat panel 12, that is, in a direction opposite to the electric field E1. When the nanoparticle 30 is located in the first area C1, as shown in FIG. 2C, a strong repulsive force (hereinafter, referred to as a first repulsive force) is present between the negative charges (−) induced in the first flat panel 10 and the negative charges induced in the surface of the nanoparticle 30. The first repulsive force is proportional to $1/r^3$. Thus, in the first area C1, as the distance between the nanoparticle 30 and the first flat panel 10 decreases, the first repulsive force sharply increases. Accordingly, the nanoparticle 30 may not contact the first flat panel 10, and thus, the nanoparticle 30 moves away from the first flat panel 10 and moves toward the second area C2. In the second area C2, since the attractive force is strong, the nanoparticle 30 moves toward the third area C3. Consequently, the nanoparticle 30 vibrates by moving between the first area C1 and the second area C2. The charges induced on the surface of the nanoparticle 30 are due to the electric field E1, a magnitude of the electric field E1 is proportional to a potential difference between the first and second flat panels 10 and 12, and the potential difference is due to the power source 16. Thus, by adjusting a DC voltage applied between the first and second flat panels 10 and 12, contact between the nanoparticle 30 and the first flat panel 10 may be prevented and controlled, which shows that the contact between the first and second flat panels 10 and 12 may be prevented and controlled by simply applying the DC voltage between the first and second flat panels 10 and 12. For example, friction between the first and second flat panels 10 and 12 may be prevented and a degree of contact may be controlled by maintaining a distance H1 between the first and second flat panels 10 and 12 that is equal to or less than the sum (L11+L22) of the first length L11 and the second length L22 when the nanoparticle 30 adheres to the surface of the second flat panel 12.

The nanoparticle 30 is coated with an insulating material to maintain a charge distribution of the nanoparticle 30. The coating of the nanoparticle 30 may be done in accordance with any of various methods.

Hereinafter, an apparatus with a friction preventing function according to an exemplary embodiment using the above-described principle will be described.

Figure 3:
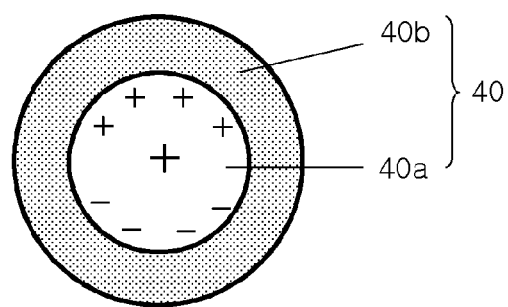
FIG. 3 is a cross-sectional view of a nano particle used in an apparatus with a friction preventing function, according to an exemplary embodiment.

FIG. 3 is a cross-sectional view of a nanoparticle 40 used in an apparatus with a friction preventing function, according to an exemplary embodiment. The nanoparticle 40 includes a conductive core 40a and a shell 40b surrounding the core 40a. The shell 40b may be, for example, aluminum oxide or silicon oxide. The shell 40b protects charges (+) charged inside the core 40a and depolarization charges (+, −) on the surface of the core 40a. Thus, a thickness of the shell 40b may be set to be proper for the protective function of the shell 40b. The thickness of the shell 40b may be uniform around the circumference of the core 40a. The core 40a may correspond to the nanoparticle 30 described with reference to FIGS. 2A to 2C. The core 40a may be, for example, a nano-sized aluminum (Al) particle. As in the case with the nanoparticle 40, a 'nanoparticle' described below refers to a particle having a diameter in a range between several nm and several hundreds of nm. For convenience of illustration and description, the nanoparticle 40 is shown as one circle.

Figure 4:
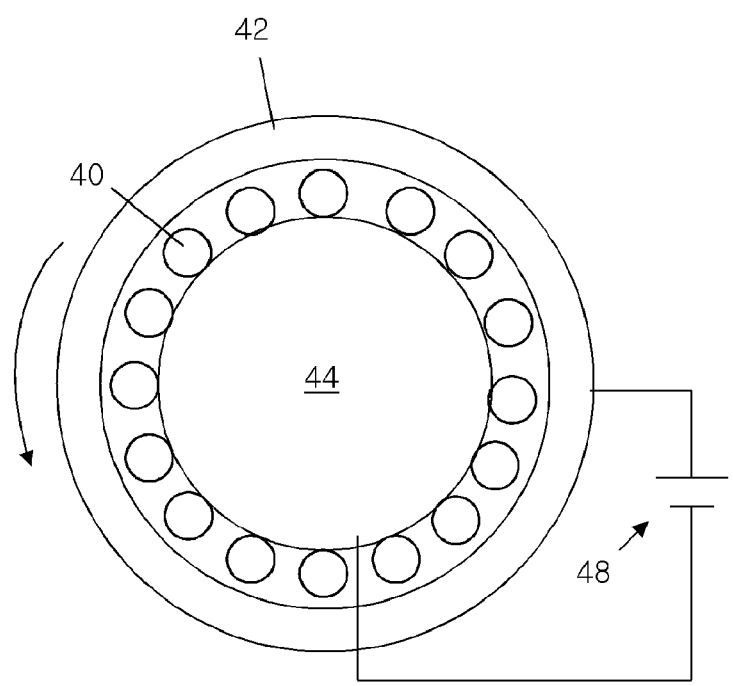
FIGS. 4 to 7 are cross-sectional views of apparatuses with a friction preventing function according to exemplary embodiments.

FIG. 4 shows an apparatus (hereinafter, referred to as a first apparatus) with a friction preventing function according to an exemplary embodiment.

Referring to FIG. 4, the first apparatus includes an axis part 44 having a predetermined diameter. The first apparatus includes a cylindrical structure 42 surrounding the axis part 44. The cylindrical structure 42 is parallel to the axis part 44. The cylindrical structure 42 and the axis part 44 are each conductors and are spaced apart from each other in a radial direction. In other words, the cylindrical structure 42 surrounds the outer circumference of the axis part 44. A gap between the cylindrical structure 42 and the axis part 44 may be uniform around the circumference of the axis part 44. The gap may be less than the sum (L11+L22) of the first length L11 and the second length L22 described with reference to FIGS. 2A to 2C. Conditions of the gap may be applied to another apparatus to be described below. The cylindrical structure 42 may be a rotating body that rotates around the axis 44. Alternately, the cylindrical structure 42 may be fixed, and the axis part 44 may rotate. A rotational axis of the cylindrical structure 42 may be the same as the axial center of the axis part 44. The cylindrical structure 42 may be a rotating body that rotates around the center of the axis part 44 or may be an object that moves along the axis part 44 in a longitudinal direction. Materials of the cylindrical structure 42 and the axis part 44 may be similar to or the same as those of a rotating body and its axis used in a general mechanical apparatus. A plurality of nanoparticles 40 are disposed between the axis 44 and the cylindrical structure 42. The nanoparticles 40 are uniformly distributed around the outer circumferential surface of the axis part 44. The axis part 44 is connected to a positive electrode (terminal) of a power source 48, and the cylindrical structure 42 is connected to a negative electrode (terminal) of the power source 48. The power source 48 may be a DC voltage source. The principle described with reference to FIGS. 2A to 2C applies to each nanoparticle 40. Thus, since the cylindrical structure 42 and the axis part 44 do not contact each other in the first apparatus, friction between the cylindrical structure 42 and the axis part 44 may be prevented. As such, since friction may be simply prevented by using the nanoparticles 40 and applying the DC voltage, there is no need to use the oil or grease that is conventionally used. In this regard, the first apparatus may be eco-friendly, and this may apply to another apparatus to be described. Also, since a current is not directly applied to prevent friction, high efficiency may be maintained, and also even though a general battery is used, the apparatus may be used for long hours.

Although not shown in the drawing, the nanoparticles 40 may be uniformly distributed around an inner circumferential surface of the cylindrical structure 42 instead of around the outer circumferential surface of the axis part 44. When the nanoparticles 40 are distributed on the inner circumferential surface of the cylindrical structure 42, the cylindrical structure 42 and the axis part 44 are connected to each other with respect to the power source 48 in a way opposite to that shown in FIG. 4. Also, even when charges charged in the middle of the nanoparticles 40 are negative charges instead of positive charges, the cylindrical structure 42 and the axis part 44 are connected to each other with respect to the power source 48 in a way opposite to that shown in FIG. 4.

Figure 5:
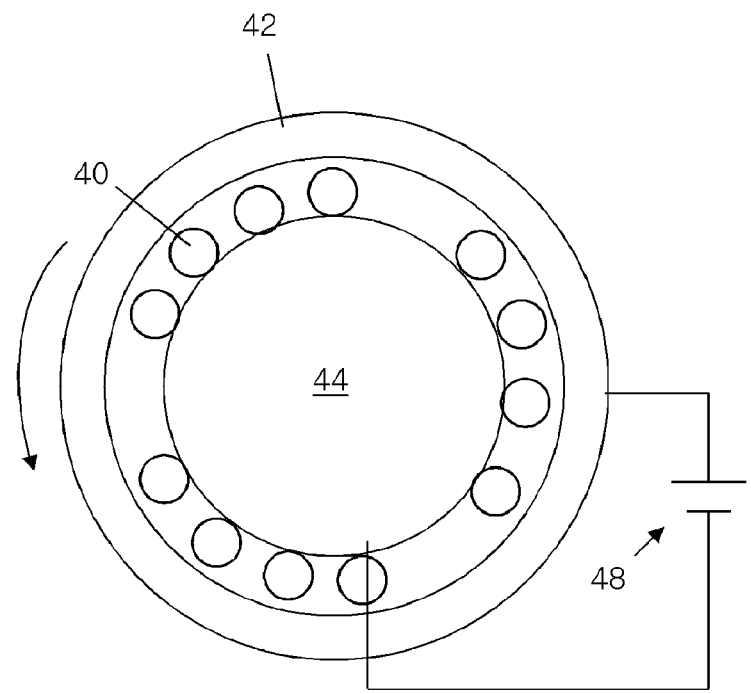

The nanoparticles 40 may be uniformly distributed around the entirety of the outer circumferential surface of the axis part 44, or the nanoparticles 40 may be distributed only around one or more portions of the outer circumferential surface of the axis part 44, as shown in FIG. 5. In FIG. 5, the DC voltage applied to the axis part 44 and the cylindrical structure 42 may be increased as compared to that in the case of FIG. 4.

Figure 6:
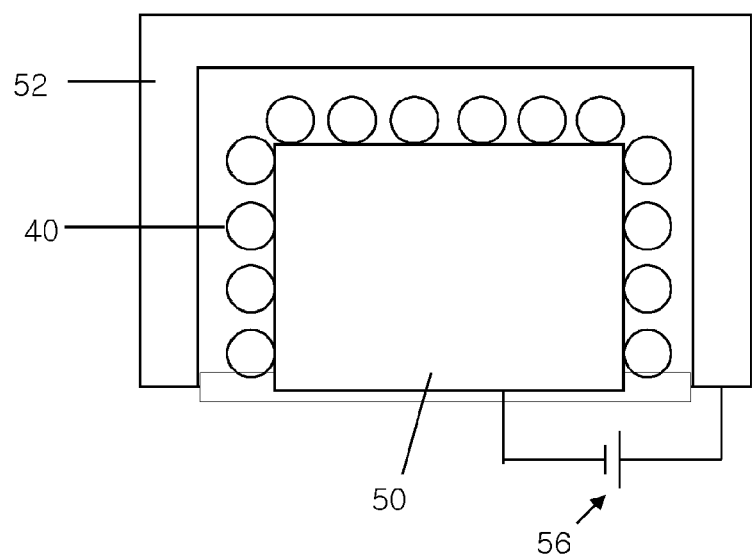

FIG. 6 shows an apparatus (hereinafter, referred to as a second apparatus) with a friction preventing function according to another exemplary embodiment.

Referring to FIG. 6, the second apparatus includes a fixed first object 50 and a second object 52 that is movable with respect to the first object 50. For example, the second object 52 may move lengthwise along the lengthwise direction of the first object 50. The first object 50 and the second object 52 are conductors that are spaced apart from each other. The first and second objects 50 and 52 may or may not entirely be conductors. For example, portions of the first and second objects 50 and 52 that face each other may be conductors, and the remaining portions of the first and second objects 50 and 52 may not be conductors. The first object 50 may be a linear rail. A cross-section of the first object 50 may have a rectangular shape, or alternatively, the cross-section of the first object 50 may have a semicircular shape or a triangular shape. A plurality of nanoparticles 40 may adhere to a surface of the first object 50 facing the second object 52. The nanoparticles 40 may be uniformly distributed entirely on the surface of the first object 50. Although the nanoparticles 40 may be spaced apart from one another in FIG. 6, each nanoparticle 40 includes a shell 40b having an insulating property, as shown in FIG. 3, and thus, the nanoparticles 40 may contact one another. The second object 52 is formed to surround the surface of the first object 50 to which the nanoparticles 40 adhere. The second object 52 may be a part of a machine (for example, a vehicle or a train) that moves above the first object 50. An inner surface of the second object 52 may be formed to correspond to a shape of an outer surface of the first object 50. The first and second objects 50 and 52 may be connected to a DC voltage power source 56. A positive electrode and a negative electrode of the power source 56 are connected to the second object 52 and the first object 50, respectively.

Although not shown in FIG. 6, the nanoparticles 40 may adhere to the inner surface of the second object 52 instead of to the outer surface of the first object 50. In this case, the connection of the power source 56 would be performed in a way opposite to that shown in FIG. 6.

Figure 7:
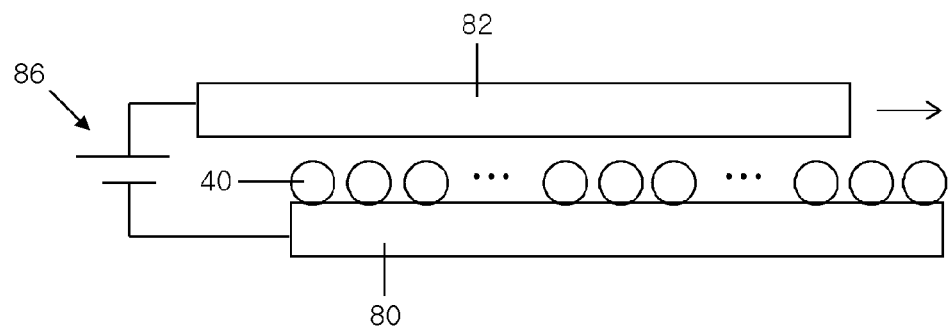

FIG. 7 shows an apparatus (hereinafter, referred to as a third apparatus) with a friction preventing function according to another exemplary embodiment.

Referring to FIG. 7, the third apparatus includes a lower structure 80, an upper structure 82, and a plurality of nanoparticles 40. The lower structure 80 is fixed and may be a flat panel having a predetermined length. A top surface of the lower structure 80 may be flat. The nanoparticles 40 are adhered to the top surface of the lower structure 80. The upper structure 82 may be an object that moves above the lower structure 80 or may be a carrier. For convenience of illustration, the upper structure 82 is shown as a flat panel in FIG. 7. Thus, a shape of the upper structure 82 may vary depending on its intended use. The lower and upper structures 80 and 82 may be conductors. The lower and upper structures 80 and 82 may entirely be conductors, or portions of the lower and upper structures 80 and 82 that are necessary for prevention of friction may be conductors. For example, in the case of the lower structure 80, a conductive layer may be disposed only on the top surface of the lower structure 80, and in the case of the upper structure 82, a conductive layer may be disposed only on a bottom surface of the upper structure 82. A DC voltage power source 86 is connected to the lower and upper structures 80 and 82. The lower structure 80 and the upper structure 82 are connected to a negative electrode terminal and a positive electrode terminal of the power source 86, respectively. When the power source 86 is in a connected state, the upper structure 82 is maintained in a non-contact state. That is, the upper structure 82 is disposed above the lower structure 80 without contacting the lower structure 80. In this state, if a force is horizontally applied to the upper structure 82, the upper structure 82 may be easily moved horizontally, without friction, with respect to the lower structure 80. The nanoparticles 40 may be adheres to the upper structure 82, which is a movable body, instead of being disposed on the lower structure 80. In this case, the connection of the power source 86 would be performed in a way opposite to that shown in FIG. 7.

Although not shown in FIGS. 4 to 7, an adherent layer may be formed on a surface to which the nanoparticles 40 adhere, and the nanoparticles 40 may adhere to the adherent layer.

Figure 8:
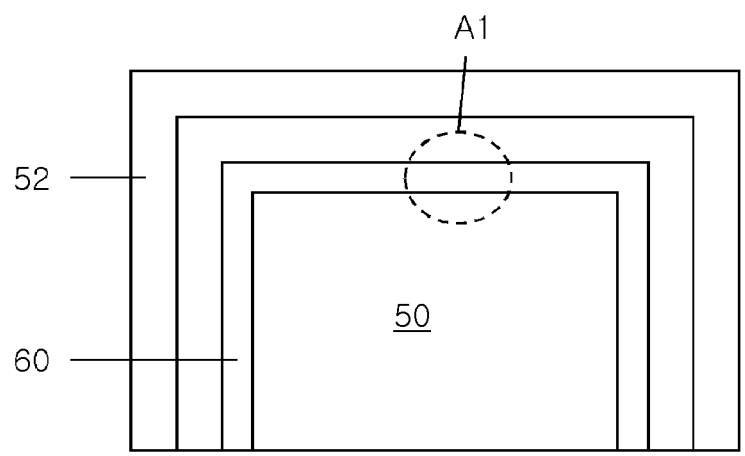
FIG. 8 is a cross-sectional view of the apparatus shown in FIG. 6 including a nano material film instead of nano particles.

FIG. 8 shows an apparatus (hereinafter, referred to as a fourth apparatus) with a friction preventing function according to another exemplary embodiment.

Figure 9:
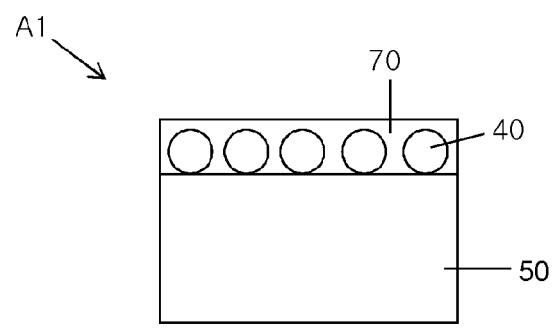
FIG. 9 is an enlarged cross-sectional view of a region A1 of FIG. 8.

Referring to FIG. 8, the fourth apparatus may be the same as the second apparatus described with reference to FIG. 6 except that a nano material film 60 is coated on a surface of the first object 50. FIG. 9 is an enlarged cross-sectional view of a region A1 including a part of the nano material film 60 of FIG. 8.

Referring to FIG. 9, the nano material film 60 includes a plurality of nanoparticles 40 and a material film 70 covering the nanoparticles 40. The material film 70 attaches the nanoparticles 40 to the first object 50 to fix the nanoparticles 40. The material film 70 may be an insulating material, and its surface may be flat. The material film 70 may be paint or paste. Thus, the nano material film 60 may be formed by mixing the nanoparticle 40 with paint or paste, kneading them, coating a resultant on a surface of the first object 50, and drying the resultant.

Figure 10:
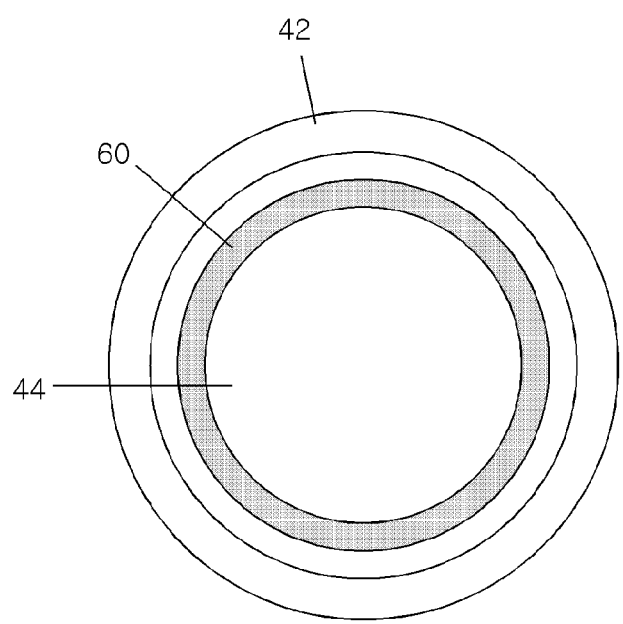
FIG. 10 is a cross-sectional view of the apparatus shown in FIG. 4 including a nano material film instead of nano particles.

FIG. 10 shows a case where the nano material film 60 is coated on an outer circumferential surface of an axis part 44 instead of on the nanoparticles 40. In the apparatuses shown in FIGS. 5 and 7, the nano material film 60 may be provided instead of the nanoparticles 40. Even when the nano material film 60 is provided instead of the nanoparticles 40, the nano material film 60 may be coated on another surface facing the original surface instead of being coated on the original surface.

Figure 11:
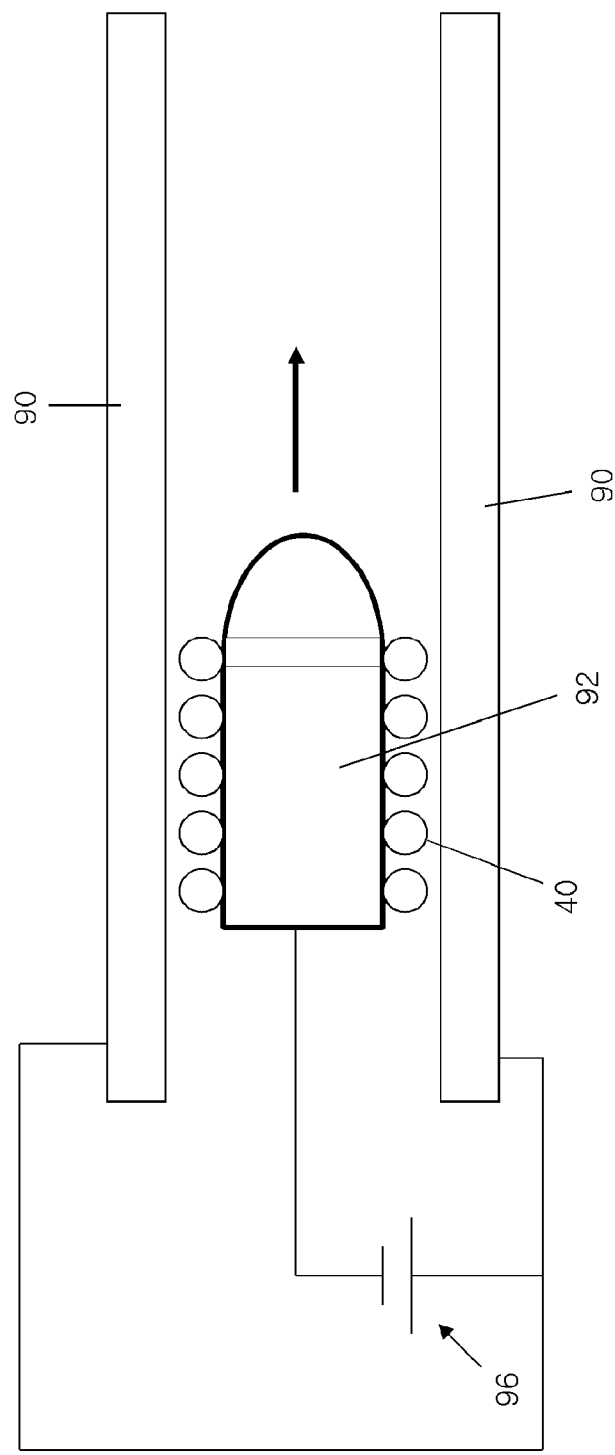
FIG. 11 is a cross-sectional view of an apparatus with a friction preventing function according to another exemplary embodiment.

FIG. 11 shows an apparatus (hereinafter, referred to as a fifth apparatus) with a friction preventing function according to another exemplary embodiment.

Referring to FIG. 11, the fifth apparatus includes a pipe 90 having a predetermined length and a movable body 92 that is released or launched through the pipe 90. The pipe 90 may be a metallic pipe or a nonmetallic pipe in which a conductive layer is coated on an inner surface. Also, the pipe 90 may be a gun barrel of a personal weapon or may be a cannon barrel of a cannon or a tank. If the pipe 90 is a gun barrel or a cannon barrel, the movable body 92 may be a launcher such as a bullet or a cannon ball. A DC power source 96 is connected to the pipe 90 and the movable body 92. A positive electrode terminal and a negative electrode terminal of the power source 96 are connected to the pipe 90 and the movable body 92, respectively. If the movable body 92 is a launcher, the movable body 92 is released out of the pipe 90, and simultaneously, the connection between the movable body 92 and the power source 96 is lost. A plurality of nanoparticles 40 may be adhered to an inner surface of the pipe 90. In this case, the connection of the power source 96 may be performed in an opposite way. Alternatively, the nano material film 60 may be provided instead of the nanoparticles 40.

Figure 12:
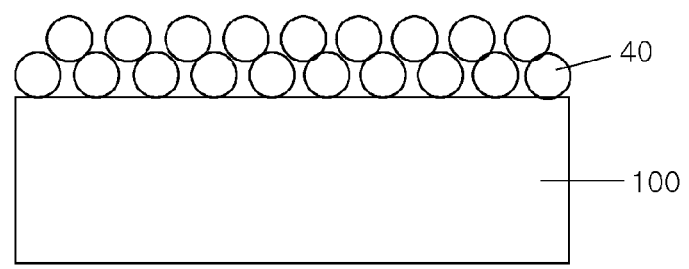
FIG. 12 is a cross-sectional view of an apparatus with a friction preventing function including nano particles configured as a multi-layered structure according to an exemplary embodiment.

Although the nanoparticles 40 of the above-described apparatuses are configured as a single-layered structure to adhere to a surface, a plurality of nanoparticles 40 may be configured as a multi-layered structure to adhere to a surface of an object 100 as shown in FIG. 12. Although FIG. 12 shows the nanoparticles 40 configured as a double-layered structure, exemplary embodiments are not limited thereto, and three or more layers may be formed.

Hereinafter, a method of manufacturing apparatuses with a friction preventing function, according to exemplary embodiments, will be described.

Figure 13:
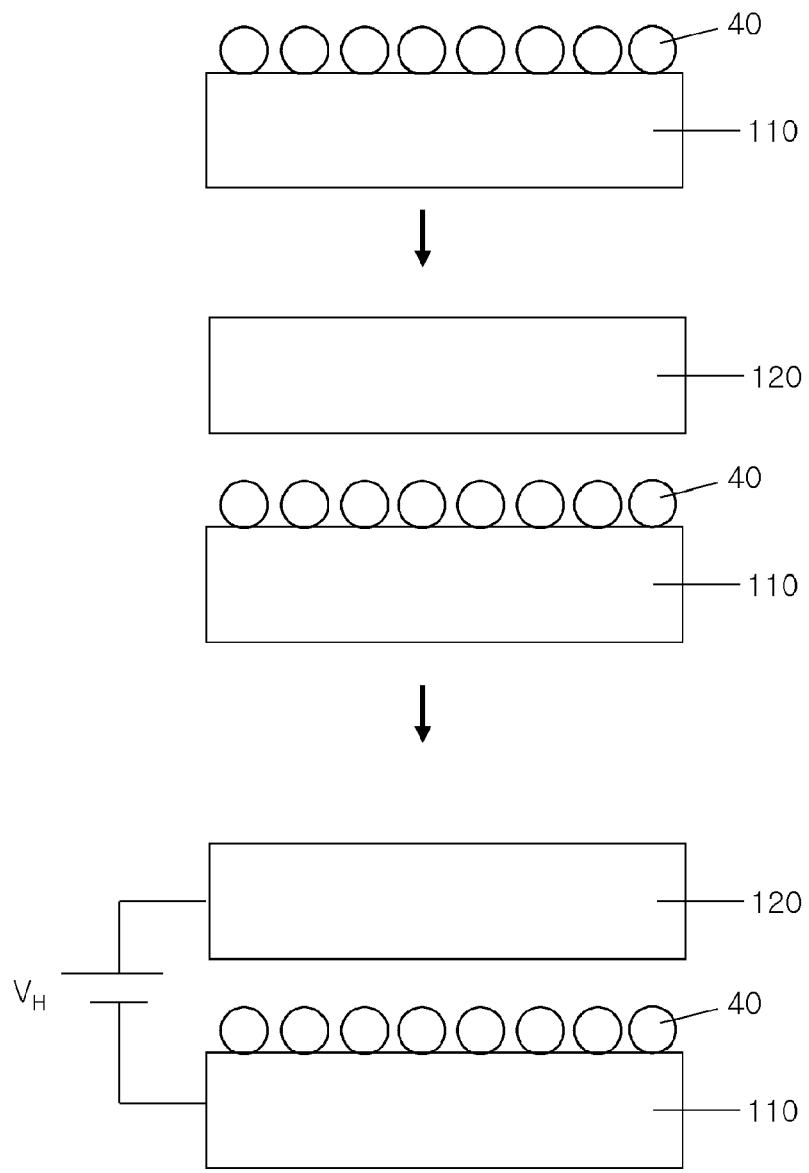
FIGS. 13 and 14 are cross-sectional views for describing an exemplary method of manufacturing an apparatus with a friction preventing function.

Referring to FIG. 13, a plurality of nanoparticles 40 adhere to a surface of a first object 110. A second object 120 is disposed to face the first object 110, such that the nanoparticles 40 are disposed between the first object 110 and the second object 120. A first voltage VH is applied between the first and second objects 110 and 120. Electrons are emitted from the nanoparticles 40 due to the application of the first voltage VH, and net charges of the nanoparticles 40 become positive charges (+). Accordingly, the nanoparticles 40 are positively charged (a state where positive charges are formed in the middle of the core 40a of FIG. 3). A degree of the emission of the electrons may be controlled by adjusting the first voltage VH.

Figure 14:
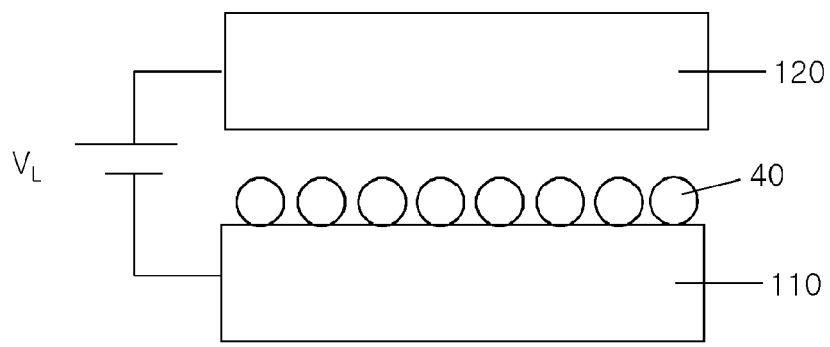

A second voltage VL is applied between the first and second objects 110 and 120, as shown in FIG. 14. The second voltage VL is applied to prevent friction, and charges (+, −) on the surface of the core 40a of FIG. 3 are induced by the second voltage VL. The second voltage VL may be lower than the first voltage VH. A gap between the first and second objects 110 and 120 may be maintained equal to or less than the sum (L11+L22) of the first length L11 and the second length L22 shown in FIGS. 2A to 2C before or at the time when the second voltage VL is applied.

As described above, the nanoparticles 40 may be charged after the nanoparticles 40 are adhered onto the first object 110, or may be charged before the nanoparticles 40 are adhered onto the first object 110. In other words, already charged nanoparticles 40 may be adhered onto the first object 110. Also, the nano material film 60 described with reference to FIG. 8, instead of the nanoparticles 40, may be coated on the first object 110. The nano material film 60 may be charged in the same way as the nanoparticles 40.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A friction preventing apparatus comprising:
a first object;
a second object spaced apart from the first object; and
a plurality of charged nanoparticles disposed between the first object and the second object,
wherein the nanoparticles are disposed on a surface of one of the first object and the second object a potential difference exists between the first object and the second object to prevent friction between the first object and the second object, and the surface is smooth, and
wherein the first object is configured to be movable with respect to the second object or the second object is configured to be movable with respect to the first object.

2. The apparatus of claim 1, wherein the nanoparticles are positively charged and are adhered to the first object, and wherein the first object has a potential lower than a potential than a potential of the second object.

3. The apparatus of claim 1, wherein the nanoparticles are negatively charged and are adheres to the first object, and wherein the first object has a potential higher than a potential of the second object.

4. The apparatus of claim 1, wherein each of the nanoparticles comprises a charged core and a shell surrounding the core.

5. The apparatus of claim 1, further comprising a material film covering the nanoparticles and filling gaps between the nanoparticles.

6. The apparatus of claim 1, wherein the first object has an outer circumferential surface, and the second object surrounds the outer circumferential surface of the first object.

7. The apparatus of claim 1, wherein the first object is a flat panel, and the second object is moveable with respect to the first object.

8. The apparatus of claim 1, wherein the first object is a rail, and the second object surrounds the rail.

9. The apparatus of claim 1, wherein the first object comprises a conductive layer facing the second object and the second object comprises a conductive layer facing the first object.

10. The apparatus of claim 5, wherein the material film is one of a paint and a paste.

11. The apparatus of claim 1, wherein the first object is a conductive pipe, and the second object is disposed inside the pipe and is moveable with respect to the pipe.

12. The apparatus of claim 11, wherein the pipe is one of a gun barrel and a cannon barrel, and the second object is one of a bullet and a cannon ball.

13. The apparatus of claim 1, wherein the nanoparticles are uniformly distributed in at least one of a plurality of areas on the surface of the one of the first object and the second object.

14. A friction preventing apparatus comprising,
an electrically-conductive first object, an electrically-conductive second object, and a plurality of nanoparticles disposed between the first object and the second object, wherein the nanoparticles are attached to a surface of one of the first object and the second object, potential difference exists between the first object and the second object to prevent friction between the first object and the second object, and the surface is smooth, and
wherein the first object is configured to be movable with respect to the second object or the second object is configured to be movable with respect to the first object.

* * * * *